United States Patent [19]
Benzoni et al.

[11] Patent Number: 5,649,039
[45] Date of Patent: Jul. 15, 1997

[54] OPTICAL FIBER FERRULE ASSEMBLY

[75] Inventors: Albert Michael Benzoni, Lower Macungie Township; Yang Choong Chen, Whitehall Township; Mindaugas Fernand Dautartas, Alburtis, all of Pa.

[73] Assignee: Lucent Technologies Inc., Murray Hill, N.J.

[21] Appl. No.: 926,555

[22] Filed: Aug. 6, 1992

Related U.S. Application Data

[63] Continuation of Ser. No. 788,961, Nov. 7, 1991, abandoned.

[51] Int. Cl.$^6$ ........................................ G02B 6/36
[52] U.S. Cl. .................................... 385/78; 385/92
[58] Field of Search ............................ 385/72, 78, 84, 385/88, 92, 93, 94

[56] References Cited

U.S. PATENT DOCUMENTS

| | | | |
|---|---|---|---|
| 4,695,124 | 9/1987 | Himono et al. | 350/96.2 |
| 4,722,584 | 2/1988 | Kakii et al. | 350/96.2 |
| 4,729,624 | 3/1988 | Kakii et al. | 350/96.2 |
| 4,758,719 | 7/1988 | Sasaki et al. | 385/92 |
| 4,767,177 | 8/1988 | Cartier | 350/96.2 |
| 4,812,006 | 3/1989 | Osborn et al. | 385/78 |
| 4,892,378 | 1/1990 | Zajac et al. | 385/78 |
| 4,911,518 | 3/1990 | Miller | 385/78 |
| 4,994,134 | 2/1991 | Knecht et al. | 156/294 |
| 4,995,695 | 2/1991 | Pimpinella et al. | 385/92 |

FOREIGN PATENT DOCUMENTS

| | | | |
|---|---|---|---|
| 0181532 | 5/1986 | European Pat. Off. | G02B 6/42 |
| 2930317 | 2/1981 | Germany . | |
| 9101772 | 5/1991 | Germany . | |
| 63-161405 | of 1988 | Japan . | |
| 8606472 | 6/1986 | WIPO . | |

OTHER PUBLICATIONS

"A High Performance Connectorized . . . ", H. M. Berg et al., *IEEE Trans. Comp., Hybrids, and Manuf. Tech.*, vol. CHMT-4, No. 4, Dec. 1981, pp. 337-344.

*Primary Examiner*—John Ngo
*Attorney, Agent, or Firm*—Wendy W. Koba; Bruce S. Schneider

[57] ABSTRACT

An optical fiber ferrule assembly is disclosed which comprises an inner sleeve (of a metallic material, for example) including a necked-down portion for securing the fiber, and an outer housing (of a plastic material, for example) formed as a cylindrical member through which the sleeve may be inserted. A washer may be attached to a flanged end portion of the sleeve and subsequently laser welded to an associated optical submount.

3 Claims, 2 Drawing Sheets

5,649,039

OPTICAL FIBER FERRULE ASSEMBLY

This application is a continuation of application Ser. No. 07/788,96, filed on Nov. 7, 1991 now abandoned.

BACKGROUND OF THE INVENTION

1. Technical Field

The present invention relates to an optical fiber ferrule assembly and, more particularly, to a ferrule assembly suitable for providing alignment of an optical fiber to an active optical device.

2. Description of the Prior Art

Most optical communication arrangements require, at some point, the coupling of an optical fiber to an active optical device, such as a laser, LED or photodiode. In most applications, the end portion of the optical fiber is contained within a cylindrical housing, referred to as a "ferrule", to provide mechanical stability of the attachment.

An exemplary ferrule arrangement is disclosed in U.S. Pat. No. 4,695,124 issued to Y. Himono et al. on Sep. 22, 1987. The Himono et al. ferrule comprises a plastic sheath which is disposed over a first end section of an optical fiber, the sheath being crimped to the fiber to fix its position. A metal cylindrical member is then mated with a portion of the sheath and formed to extend over an exposed section of the fiber. The metal member may then be soldered to an optical package without affecting the fixation of the fiber within the plastic sheath member.

U.S. Pat. No. 4,729,624 issued to T. Kakii et al. on Mar. 8, 1988 discloses an alternative arrangement wherein the ferrule comprises a resin composition, having carbon fiber as a filler material. The ferrule has a metal tube around its body that is embedded in its flange portion for added flexural rigidity.

SUMMARY OF THE INVENTION

The present invention relates to an optical fiber ferrule assembly and, more particularly, to a fiber ferrule assembly suitable for a low-cost, high volume manufacturing capability.

In an exemplary embodiment of the present invention, a ferrule assembly comprises a metallic inner sleeve through which the fiber (with the outer jacket, or cladding, removed) is inserted. The metallic sleeve includes a central bore with a necked-down portion for securing the fiber, and a flanged end portion. The metallic inner sleeve is inserted within an outer housing, where the housing may include an indentation for mating with the flanged end of the inner sleeve. To maintain low cost, the outer housing may comprise a plastic material.

In an alternative embodiment, a metallic washer may be disposed between the ferrule assembly and an optical device mounting member. The metallic washer, which contacts both the metallic inner sleeve and a ground plane on the mounting member thus provides a grounding arrangement for the optical arrangement, particularly useful in optical receivers wherein EMI is a problem.

An advantage of the ferrule assembly of the present invention is that the ferrule may be utilized with any type of optical mounting structure.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
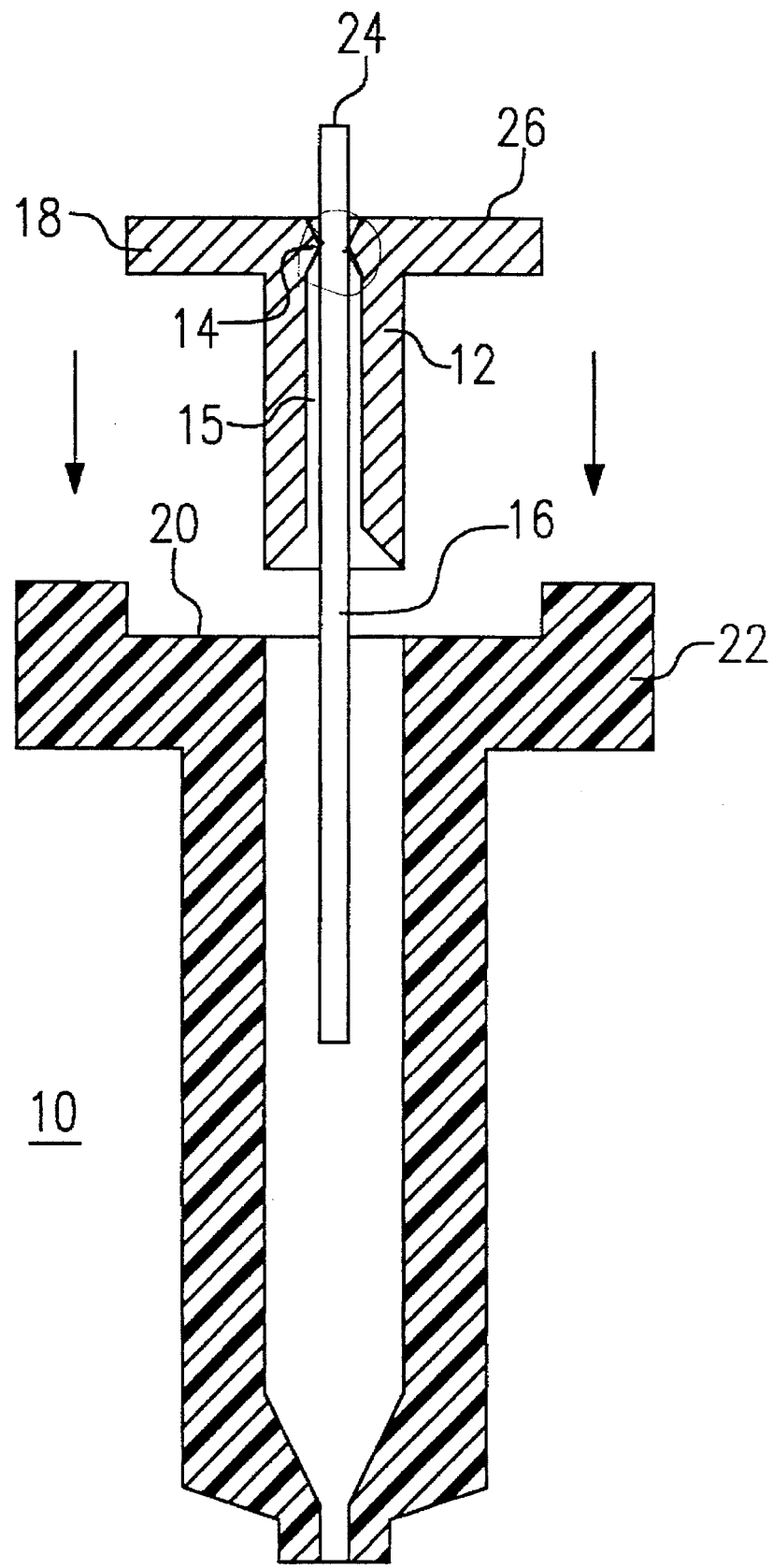
FIG. 1 illustrates, in an exploded view, a ferrule assembly of the present invention.

FIG. 1 contains an exploded view of an exemplary fiber ferrule assembly 10 formed in accordance with the present invention. Ferrule assembly 10 comprises an inner sleeve 12, including a necked-down portion 14 for securing an optical fiber 16. The fabrication of sleeve 12, which may be a stamped process, allows for the accurate formation of necked-down portion 14 with respect to the dimensions of optical fiber 16. The formation of necked-down portion 14 thus secures the location of fiber 16 within sleeve 12. Inner sleeve 12 further comprises a flanged end portion 18. In a preferred embodiment of the present invention, inner sleeve 12 is formed of a metal (such as stainless steel or copper), since the metal may be accurately stamped or machined to form the required necked-down portion. However, other materials, such as a ceramic or high-performance engineering plastic, may also be used to form the inner sleeve of the ferrule arrangement of the present invention.

During assembly of the ferrule, inner sleeve 12 is inserted within a housing 22 (as indicated by the arrows in FIG. 1), where ranged end portion 18 may rest upon an indented top surface 20 of housing 22. Housing 22 may comprise a relatively inexpensive material, for example, an extruded ryton or other plastic composition. As shown, the endface 24 of fiber 16 extends beyond the top surface 26 of ranged portion 18.

Figure 2:
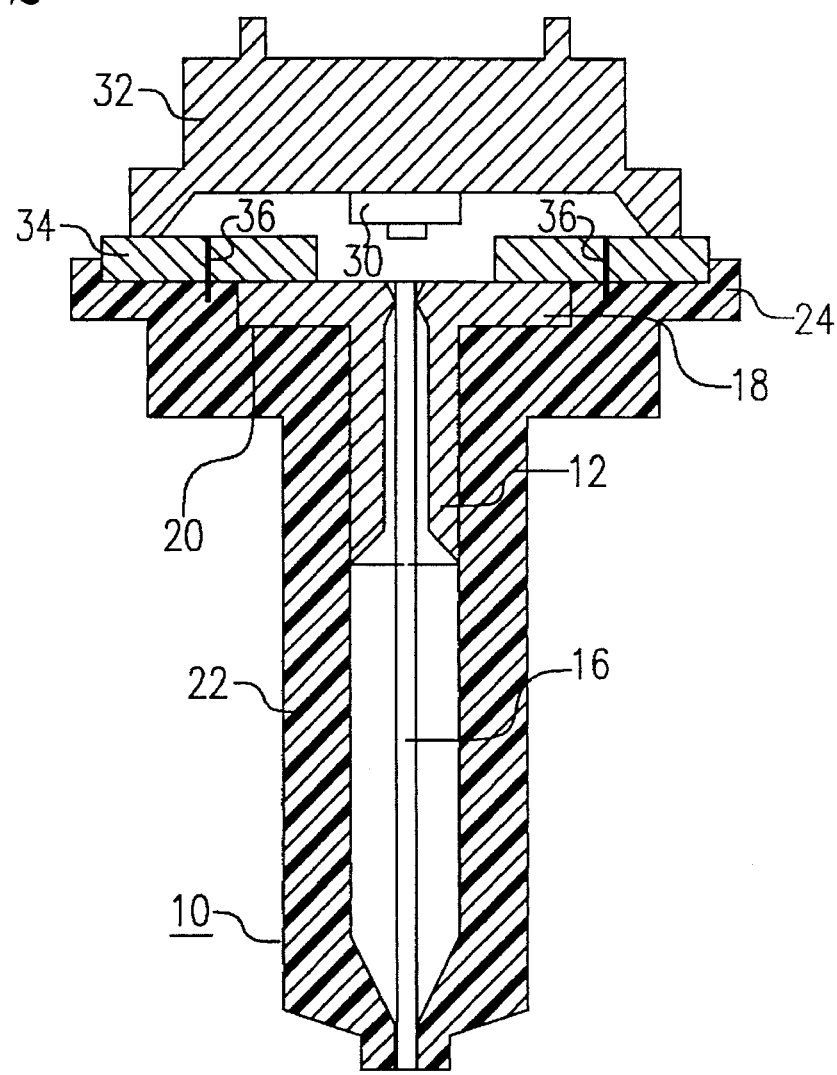
FIG. 2 illustrates a complete ferrule assembly of the present invention, including a grounding washer, as well as an associated optical device and supporting member.

FIG. 2 illustrates an exemplary ferrule assembly of the present invention attached to a support member containing an active optical device. As seen in this view, indentation 20 of housing 22 is formed so that flanged portion 18 of sleeve 22 is essentially flush with the top surface of housing 22. An optical device 30 is illustrated as being attached to a support member 32, where member 32 may be moved with respect to ferrule assembly 10 to as to achieve optical alignment with fiber 16. In the arrangement as shown, a washer 34 is disposed between assembly 10 and member 32. Washer 34 is sized to as to overlap flanged end portion 18 of inner sleeve 12 such that the pieces may be joined, using, for example, a laser welding technique. Alternatively, the pieces may be designed to be fixed using an interference fitting technique or mechanical attachment in the form screws 36. For the particular embodiment of FIG. 2, housing 22 is formed to include an outer flange portion 24 for mating with washer 34. In arrangements utilizing a metallic member 32 and metallic washer 34, washer 34 may also be laser welded directly to member 32.

Figure 3:
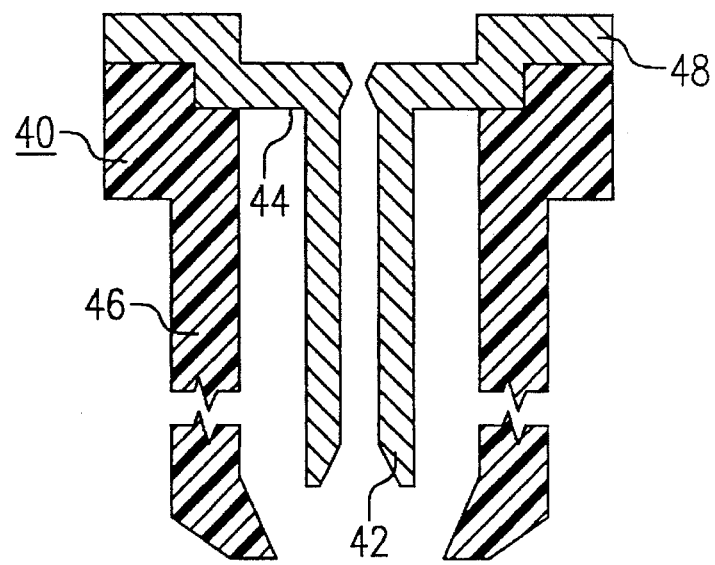
FIG. 3 illustrates an alternative ferrule assembly of the present invention, incorporating a grounding member within the inner metallic sleeve.

In an alternative to the arrangement of FIG. 2, an inner sleeve may be formed (using a powder metallurgy process, for the example of a metallic inner sleeve) to include a second, outer flange in the form of the above-described washer. FIG. 3 illustrates an exemplary ferrule 40 including an inner sleeve 42 with a first, inner flange portion 44 for mating with outer housing 46 and a second, outer flange portion 48 for attachment (using laser welding, for example) to an optical mounting structure (not shown).

It is to be understood that although the above-described arrangement discloses embodiments utilizing a metallic inner sleeve and plastic outer housing, various other materials may be used to form either ferrule piece part and remain within the spirit and scope of the present invention.

We claim:

1. An optical subassembly comprising an active optical device mounted on a support substrate;

an optical fiber for communicating with said active optical device; and a ferrule for encasing the optical fiber and coupling said optical fiber to said active optical device

CHARACTERIZED IN THAT the ferrule comprises an inner sleeve including a central bore for receiving the optical fiber, said central bore comprising a necked-down region for securing said optical fiber, said inner sleeve further comprising a flanged end portion for facilitating physical contact between the optical device support substrate and said ferrule, including a washer disposed to contact said flanged end portion of said inner sleeve, with said support substrate being laser welded to said washer; and an outer housing including a central bore for mating with said inner sleeve such that said inner sleeve is located within the outer housing central bore.

2. An optical subassembly as defined in claim 1 wherein the flanged end portion of the inner sleeve comprises a stepped profile including an inner flange portion and an outer flange portion, the inner portion for contacting the outer housing and the outer portion for contacting the optical device support substrate.

3. An optical subassembly as defined in claim 2 wherein the support substrate comprises a support member, laser welded to the outer flange portion of the inner sleeve.

* * * * *